Sept. 21, 1971    D. GRUBE    3,606,943
CONVEYOR

Filed Sept. 8, 1969    2 Sheets-Sheet 1

INVENTOR.
DIETRICH GRUBE
BY Holman, Glascock,
Downing & Seebold
ATTORNEYS

Sept. 21, 1971  D. GRUBE  3,606,943
CONVEYOR
Filed Sept. 8, 1969  2 Sheets-Sheet 2
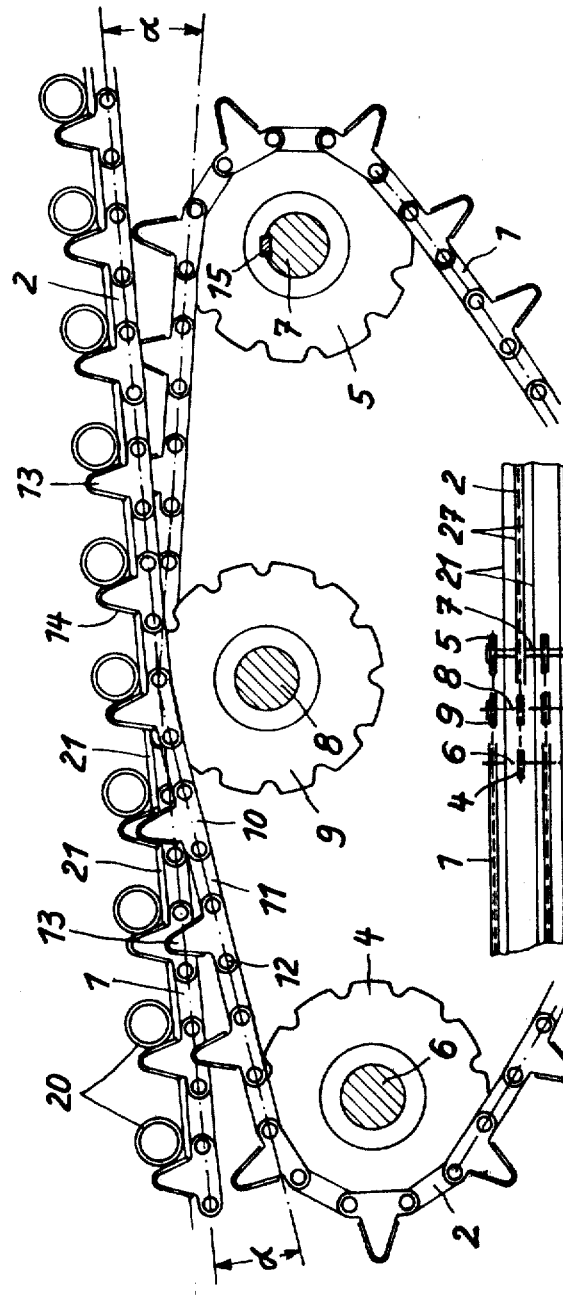
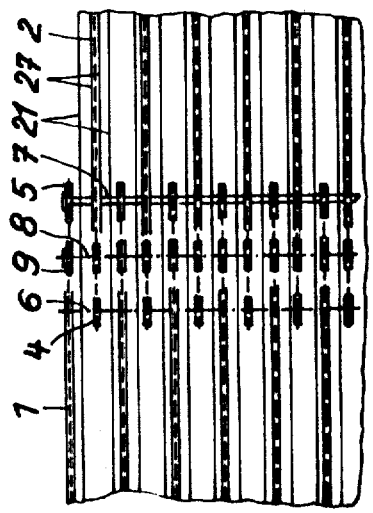
INVENTOR.
DIETRICH GRUBE

United States Patent Office 3,606,943
Patented Sept. 21, 1971

3,606,943
CONVEYOR
Dietrich Grube, Ratingen-Tiefenbroich, Germany, assignor to Schloemann Aktiengesellschaft, Dusseldorf, Germany
Filed Sept. 8, 1969, Ser. No. 855,903
Claims priority, application Germany, Sept. 16, 1968,
P 17 77 173.2
Int. Cl. B65g 37/00
U.S. Cl. 198—102        12 Claims

ABSTRACT OF THE DISCLOSURE

Wear and efficiency factors limit the length of an endless chain-type conveyor to about 20 yards, and for conveying hot metal tubes or bars for cooling up to 60 yards of cooling bed are required at modern speeds. Such a cooling bed has a number of sequentially arranged chain-type conveyors for conveying stock transverse to its axis, the conveyors being coupled for a smooth reliable transfer of stock. The ends of the conveyors to be coupled overlap with their chains interleaved with a set of coupling sprocket wheels mounted on a single shaft carrying the chains of both conveyors; and the end sprocket wheels of each conveyor are below the coupling sprocket wheels and more distant from the centre of the conveyor than the coupling sprocket wheels.

---

The invention relates to a conveying apparatus having preferably a chain conveyor system, especially for tubes or solid material of, for example, round or rectangular cross-section. In particular, the conveying apparatus can be used as a cooling bed having a long cooling area.

The length of a cooling bed having a single conveyor of the chain type is limited in that an endless chain cannot be made as long as desired since the tensile forces, and hence the wear, increase beyond acceptable limits above a certain length. The normal length along which such endless chains may be drawn is generally restricted to 15–18 metres. On the other hand, the stock to be cooled often requires a greater cooling capacity with larger and longer cooling areas of, for example, 40 metres, and appropriate cooling times. It is therefore necessary to arrange a cooling bed having several conveyors of this type one behind the other, although, considerable difficulties are presented in connection with the transfer from one cooling bed to the other.

According to the invention, there is provided a conveying apparatus having means for conveying elongated members of generally uniform cross-section generally perpendicular to their axes, the apparatus comprising a plurality of conveyors arranged and coupled in sequence to provide a conveying path, each conveyor having at least two generally parallel endless conveying members having means for engaging the elongated members, the conveyors being coupled with the conveying members of both a first upstream conveyor and a second downstream conveyor passing over coupling rotary supporting means mounted on a common shaft near the downstream end of the first conveyor and near the upstream end of the second conveyor, downstream rotary supporting means of the first conveyor being mounted downstream of the below (relative to the conveying path of the second conveyor) the coupling rotary supporting means, and upstream rotary supporting means of the second conveyor being mounted upstream of the below (relative to the conveying path of the first conveyor) the coupling rotary supporting means, and drive means for operating the conveyors.

The invention can provide a means of transferring the stock, which is liable to damage, from one conveyor to another in a reliable manner.

With this type of arrangement according to the invention of free and driven sprocket wheels for a conveyor transfer arrangement, the transfer of the stock to be cooled from one conveyor to the next can be reliably performed. This reliability in operation can be further ensured by the fact that, according to a preferred feature of the invention the angle between the loaded and unloaded conveyors conveying to or diverging from a point of stock transfer is between 2 and 15°.

This can ensure that stock does not become jammed between the engagement members of two consecutive conveyors.

According to a further feature of the invention, the individual conveying members which are preferably conveyor chains are driven in synchronisation, so that a reliable transfer of stock from one conveyor to the next can be performed without an expensive, complicated apparatus.

The invention will now be further described, by way of example, with reference to the accompanying drawings, of which:

FIG. 2 is a cross-sectional view at a transfer location from one conveyor to another of the cooling bed of FIG. 1; and FIG. 3 is a plan view of the transfer location shown in FIG. 2.

Figure 1:
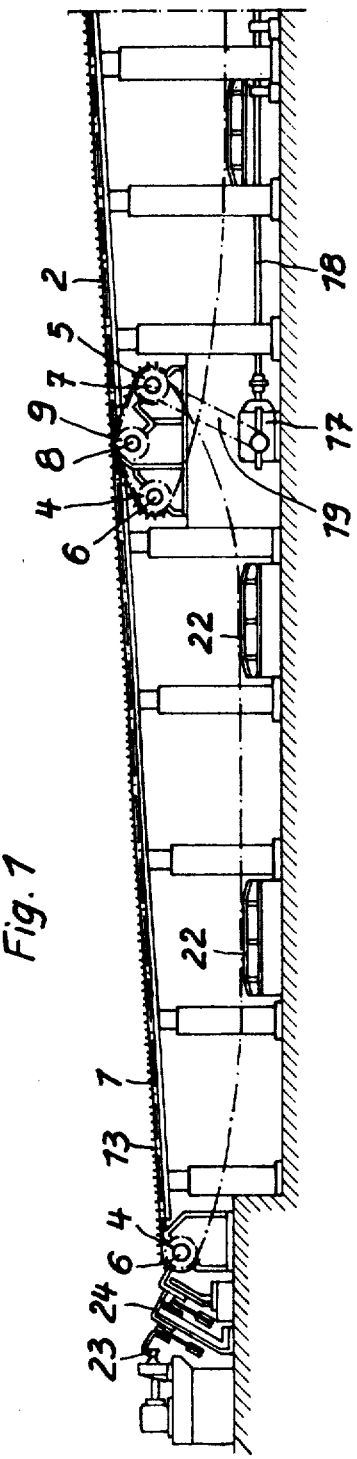
FIG. 1 is a side view of a long cooling bed having three sequential conveyors, feed means and receiving means.
Figure 1:
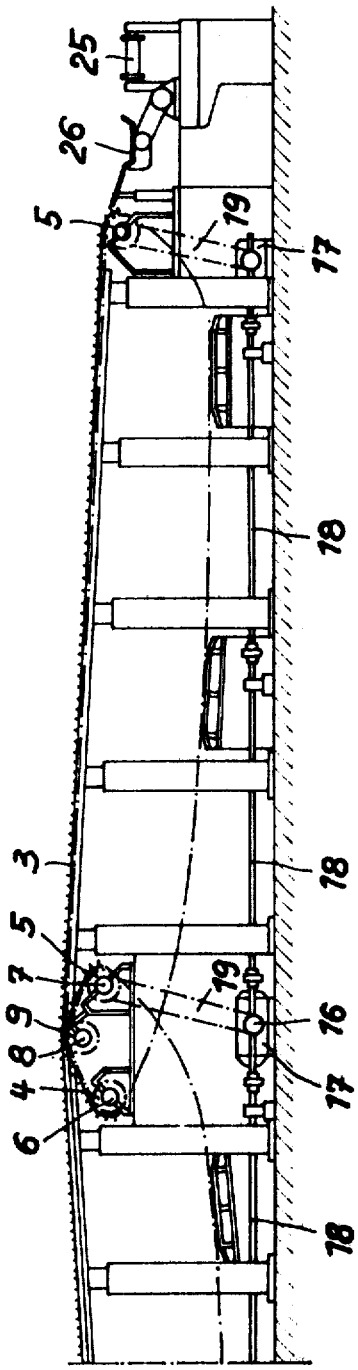

A cooling bed for transporting elongated members such as tubes or bars having a round or rectangular cross-section comprises a number of chain-type conveyors 1, 2 and 3, which are each arranged to run on a set of freely rotatable sprocket wheels 4 and downstream drive sprocket wheels 5, the sets of sprocket wheels 4 and 5 being mounted on shafts 6 and 7 respectively. The conveyors 1, and 2 run on a set of freely rotatable sprocket wheels 9, and the conveyors 2 and 3 run on a downstream set of sprocket wheels 9; each set of sprocket wheels 9 are mounted on shaft 8.

The chains of the conveyors 1, 2 and 3 each comprise links 10 and 11 (FIG. 2) which are connected together by means of bolts or pins 12. The links 10 have on each of their outer sides engagement members 13 which taper conically upward and extend outwards with respect to the endless chains. Thus, pairs of transversely aligned engagement members are provided, which are connected together by means of a plate 14 which extends across the chain and fits over each pair of engagement members 13.

Whereas the sprocket wheels 4 rotate freely on the shaft 6, the drive sprocket wheels 5 are connected to the drive shaft 7 rigidly by means of a key 15. A drive motor 16 acts through a transmission 17, shafts 18 and chains 19 to drive shafts 7 in synchronisation. This can ensure that the transfer of stock i.e. tubes or bars from one conveyor to the next is effected satisfactorily without damage to the stock.

At a point of transfer, as shown in FIGS. 2 and 3, the sprockets 4 are located with their shaft 6 upstream of the vertical plane and below the horizontal axial plane of the shaft 8 which carries the freely rotatable sprocket wheels 9. In a similar manner, the shaft 7 of the drive sprockets 5 is located downstream of the vertical plane and below the horizontal axial plane of the shaft 8.

The arrangement shown in FIG. 2 is such that the load carrying portion of the conveyor 1 and the unloaded portion of the conveyor 2 extending from the sprockets 4, both of which conveyors are guided over the sprockets 9, form an angle α which can vary from 2° to 15°. The same angular arrangement is true of the conveyors 1 and 2 leaving the sprockets 9, although conveyor 2 is the upper loaded conveyor and conveyor 1 the lower conveyor. This should ensure that the engagement members 13 of conveyor 2 are moved upwards and forwards in an almost vertical position gradually between the upper conveyor 1 to pass over the sprockets 9, after which the engagement members 13 of the chains of the conveyor 1 move gradually downwards in an almost vertical position and withdraw from between the chains of conveyor 2; thus the load is smoothly transferred from conveyor 1 to conveyor 2.

This makes it possible to avoid jamming the stock; for example, tubes 20 are located on the upper conveyor between the engagement members 13 on the upper conveyor and also the engagement member 13 of the rising or falling conveyor. Across the load bearing conveyors, the chains of which are spaced at a distance of about 800 mm. from each other, slide rails 21 are provided, on which round material such as tubes 20 engaged by the engagement members 13 can roll while rectangularly shaped material can slide thereon. The load bearing portions of the chains of the conveyors 1, 2 and 3 are laterally guided along their whole length by U-shaped rails 27 which are not shown in detail, while the unloaded portions passes at two locations over slide guides 22.

The cooling bed is preceded by a roll-on conveyor 23 with tube transfer system 24 and followed by a roll-off conveyor 25 with transfer means 26.

I claim:

1. A bed for conveying and for cooling elongated members of generally uniform cross-section, said elongated members being conveyed generally perpendicular to their axes, and comprising a plurality of conveyors arranged and coupled in sequence to provide a path of conveying, and drive means for the conveyors, wherein each conveyor has at least two generally parallel endless conveying chains arranged on sprocket wheels and having means for engaging the elongated members, two of said conveyors being coupled together with the chains of both a first and a second conveyor passing over transfer sprocket wheels mounted on a common shaft near the downstream end of the first conveyor and near the upstream end of the second conveyor, the downstream sprocket wheels of the first conveyor being mounted downstream of and below the transfer sprocket wheels and the upstream sprocket wheels of the second conveyor being mounted upstream of and below the transfer sprocket wheels.

2. A bed as claimed in claim 1, wherein the transfer sprocket wheels are freely rotatably mounted on the common shaft.

3. A bed as claimed in claim 1, wherein the angle between the conveying path upstream of said transfer sprocket wheels formed by the first conveyor chains and the chains of the second conveyor extending between its upstream sprocket wheels and the transfer sprocket wheels is in the range 2° to 15°.

4. A bed as claimed in claim 1, wherein the angle between the conveying path downstream of said transfer sprocket wheels formed by the second conveyor chains and the chains of the first conveyor extending between the transfer sprocket wheels and the downstream sprocket wheels is in the range 2° to 15°.

5. A bed as claimed in claim 1, wherein the drive means comprises a single motor and transmission means for driving all the conveyors in synchronisation.

6. A bed as claimed in claim 1, wherein the downstream sprocket wheels of each conveyor are driven.

7. A bed as claimed in claim 6, wherein the other sprocket wheels of each conveyor are freely rotatably mounted on shafts.

8. A bed as claimed in claim 1, wherein the engagement means comprises pairs of projections extending outwardly with respect to the endless chains from each side thereof, the pairs of projections being at the same periodic intervals on each chain.

9. A bed as claimed in claim 7, wherein a transverse member extends between each pair of projections, the transverse member being arranged to abut an elongated member for conveyance.

10. A bed as claimed in claim 1, wherein the engagement means are smooth and taper away from the chain.

11. A bed as claimed in claim 1, wherein alternate said transfer sprocket wheels carry the chains of the first conveyor and the remaining said transfer sprocket wheels carry the chains of the second conveyor.

12. A bed as claimed in claim 1, wherein feed means are arranged to feed elongated members to an upstream one of said conveyors, and receiving means are arranged to receive the elongated members from a downstream one of said conveyors.

References Cited

UNITED STATES PATENTS

| | | | |
|---|---|---|---|
| 2,205,628 | 6/1940 | Morrison | 198—102X |
| 3,217,857 | 11/1965 | Ellis et al. | 198—102X |

GERALD M. FORLENZA, Primary Examiner

F. E. WERNER, Assistant Examiner